United States Patent [19]

Narayanaswami

[11] Patent Number: 5,568,401
[45] Date of Patent: Oct. 22, 1996

[54] SYSTEM AND METHOD FOR TRANSFORMING PROGRAM CODE FOR EFFICIENT PIXEL PROCESSING

[75] Inventor: Chandrasekhar Narayanaswami, Austin, Tex.

[73] Assignee: International Business Machines Corporation, Armonk, N.Y.

[21] Appl. No.: 124,115

[22] Filed: Sep. 20, 1993

[51] Int. Cl.$^6$ .................................................. G06K 9/62
[52] U.S. Cl. ........................... 364/514 A; 395/162
[58] Field of Search ........................... 364/514, 514 A, 364/514 B; 395/162, 164, 133, 136; 382/276, 302, 307

[56] References Cited

U.S. PATENT DOCUMENTS

| | | | |
|---|---|---|---|
| 4,322,716 | 3/1982 | Sternberg | 364/900 X |
| 4,528,636 | 7/1985 | Robinson, III | 364/900 X |
| 5,274,760 | 12/1993 | Schneider | 395/162 |

OTHER PUBLICATIONS

IBM TDB, "Parallel Bresenham Line Algorithm", vol. 35, No. 7, Dec. 1992, pp. 270–272.
*International Journal of Computational Geometry & Applications*, vol. 1, No. 4, 1991, "Determination of Mass Properties of Polygonal CSG Objects in Parallel", C. Narayanaswami et al, pp. 381–403.

*Primary Examiner*—Emanuel T. Voeltz
*Assistant Examiner*—Edward Pipala
*Attorney, Agent, or Firm*—Mark S. Walker

[57] ABSTRACT

System and method for pixel processing using a limited set of equations modified by coefficients stored in tables. The invention provides a method for implementing the wide range of functions required by graphics processing without increasing the code size and without increased function call overhead. Each function is specified in terms of variables and coefficients. Different tests for each function are used to select the coefficients for that function. Coefficients are maintained in tables that can be easily accessed without function call overhead.

3 Claims, 2 Drawing Sheets

5,568,401

SYSTEM AND METHOD FOR TRANSFORMING PROGRAM CODE FOR EFFICIENT PIXEL PROCESSING

BACKGROUND OF THE INVENTION

1. Field of the Invention

The present invention relates to graphics processing systems and more particularly to systems for efficiently implementing pixel processing in system side processing.

2. Background and Related Art

High function graphics processing systems have traditionally relied on specialized hardware to perform complex graphic calculations and pixel processing. The special purpose hardware was structured to rapidly and efficiently perform the processing steps.

Recent increases in the processing power of general purpose workstations, particularly RISC architecture workstations, has led to their use for graphics processing without added hardware. The use of general purpose processors to perform the complex pixel processing calculations raises many performance issues.

Pixel processing procedures contain a large amount of conditional logic resulting in the generation of numerous branch instructions. The branches, in turn, exist in many flavors to meet the specific processing requirements. Procedures with numerous branch instructions inhibit instruction scheduling efficiencies because the branches interfere with instruction pipelines and the use of an instruction cache. The presence of multiple branch flavors results in a large volume of process code with only minor differences.

Inefficient instruction scheduling and large executable code libraries reduce the ability of general purpose workstations to provide complex graphics processing with performance approaching that of systems with special purpose hardware.

A system and process for implementing pixel processing operations that limits the use of branch instructions and avoids large executable code sizes is needed.

One solution to the problem of different flavors of branch code is to define a few branch functions that can be called with varying parameters. The use of parameters avoids having separate code segments for each condition. This solution has the disadvantage of requiring increased processor overhead due to the overhead associated with function calls. The net result may be little improvement over the prior art solutions.

A second solution is to introduce new complex pixel processing instructions into the general purpose system. In effect, the new instructions replace portions of the specialized graphics hardware with specialized graphics instructions. This approach has the disadvantage of creating complicated instructions that often require multiple processing cycles making them difficult to schedule for execution. The new instructions may not be easily integrated into existing compilers and tools and may prove difficult to use in practice. Minor functional changes may render the new instructions useless. Finally, adding new complex instructions violates the Reduced Instruction Set Computer (RISC) design philosophy. Finally, this approach limits instruction branching but does not address the issue of overall code size.

Another proposed approach is to minimize code volume by building snippets of assembly language code and causing the system to assemble currently relevant snippets in the data area for execution. This procedure, in effect, provides editing of instruction sequences without the overhead penalty of function call overhead. This approach does minimize the code size but suffers from several drawbacks. The use of assembly language code makes the solution very machine specific and not very portable. Snippets of code are not aware of current processor register usage and, as a consequence, cannot be optimized based on register usage. Assembling the snippets at runtime introduces overhead to the system that will impact overall performance. This solution does not address the problem of reducing instruction branches only code size minimization.

Thus, a solution is needed that results in fewer instruction branches and a smaller code base size without significantly increasing processor overhead.

SUMMARY OF THE INVENTION

The present invention provides a system and method for processing graphics commands on a general purpose processor with increased efficiency. The system of the present invention implements pixel processing for different parameters by changing the data on which the code operates rather than the instruction sequence. Modification of data areas requires less overhead than modifying instructions. Use of memory resident or loadable tables avoids the overhead of function calls but provides similar flexibility. The only performance penalty results because a specific purpose algorithm is replaced by a general purpose algorithm. On balance, however, processor performance improves.

The present invention performs graphic pixel processing by the steps of: determining the test type and selector, accessing a lookup table to determine the coefficients associated with the function and selector, solving the function, and transmitting the results. The apparatus includes a processor and program code implemented on the processor for determining a selector, accessing a table in storage, substituting the table coefficients in the pixel processing equation and providing the processed pixel data to the frame buffer.

It is therefore an object of the present invention to provide a system able to perform complex graphic processing without performance degradation from large numbers of branch instructions.

It is yet another object of the invention to provide a method for processing graphics instructions that operates without requiring multiple copies of largely redundant code.

It is still another object of the invention to use memory resident, modifiable parameters to control pixel processing rather than using specialized instruction sequences.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
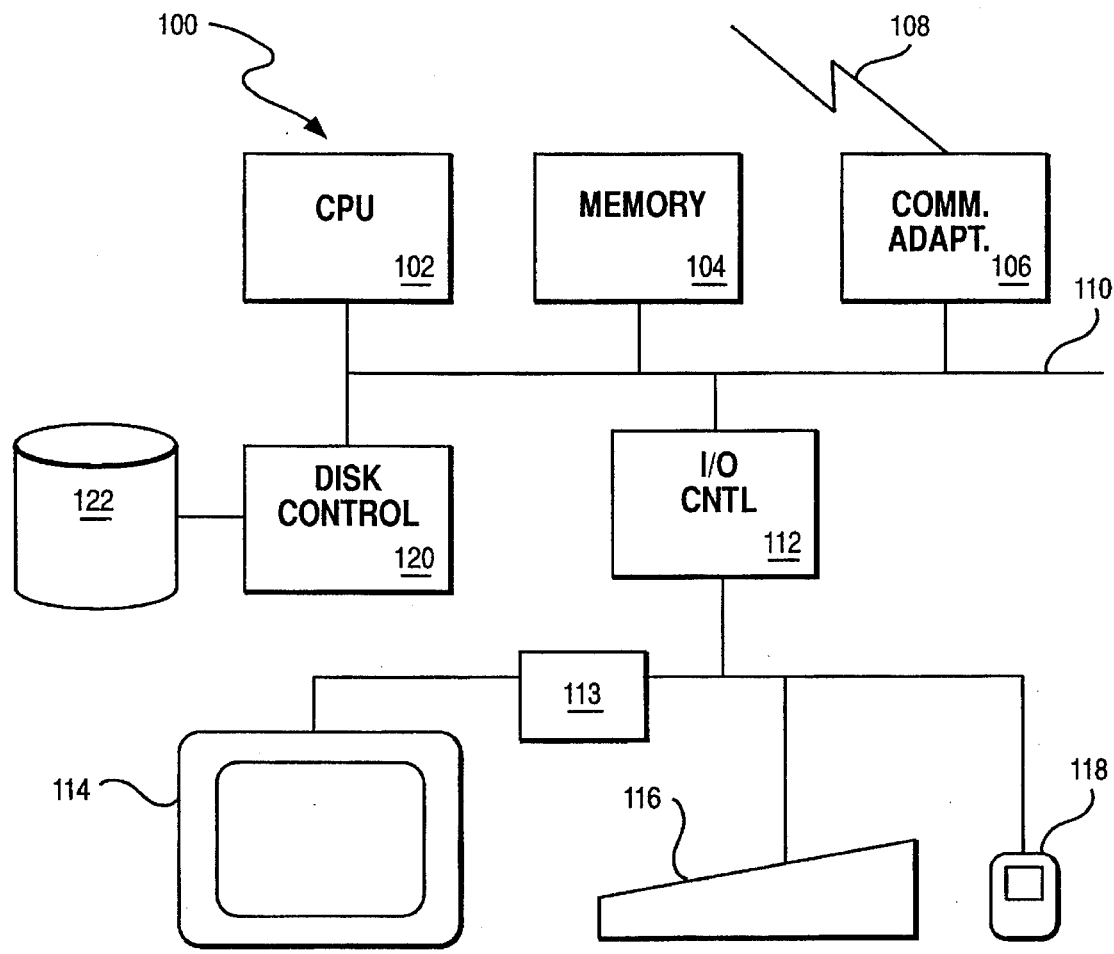
FIG. 1 is a block diagram of a computer system on which the current invention is implemented.

The present invention is implemented in a computer system such as that shown in FIG. 1. The computer system is preferably an IBM RISC System/6000 computer from the IBM Corp. (IBM and RISC System/6000 are trademarks of the IBM Corp.) though any similar workstation, personal computer or mainframe computer could be employed.

The computer system 100 has a processing unit 102, random access memory 104 and permanent storage 122. In addition, an optional communications adapter 106 enables communication with other computer systems. Input/Output controller 112 controls interaction with the video display 114, the keyboard 116 and pointing device 118. A graphics memory or frame buffer 113 is introduced between the I/O controller and the display for storing the display image to be displayed. Disk controller 120 controls interaction between the processing unit and the permanent storage 122. The options represented here are typical components used in the preferred embodiment. Other components with similar function could replace those shown, for example, a removable diskette or an optical drive could be used in place of a magnetic drive for permanent storage 122 and the processor 102 could be comprised of a number of processing engines in a multiprocessor or parallel processing architecture.

Figure 2:
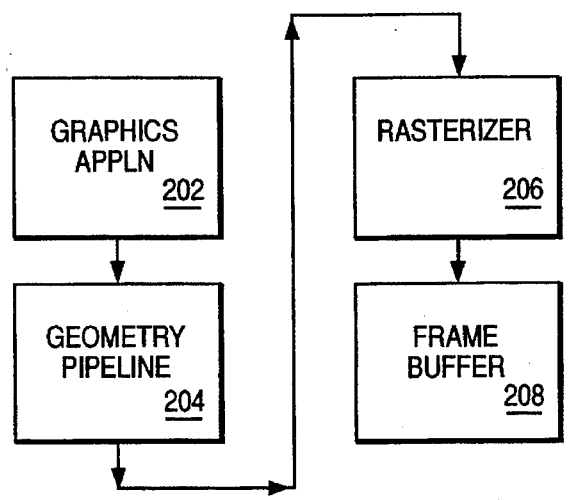
FIG. 2 is a block diagram of a graphics system according to the present invention.

The process of performing high function graphics processing is shown generally in FIG. 2. High function graphics processing includes three-dimensional (3D) processing but can also involve two-dimensional (2D) processing. A graphics application 202 interacts with the system user to create a graphics image expressed as a series of graphics commands. The graphics commands are passed to the geometry pipeline 204 for processing. The geometry pipeline transforms, scales and processes the primitives before passing them to the rasterizer 206. The function of rasterizer 206 is to transform the graphics commands into a displayable image. The transformation requires generation of displayable pixels (or picture elements) that are stored in frame buffer 208. The data in frame buffer 208 is read by the display system and displayed on display device 114.

Figure 3:
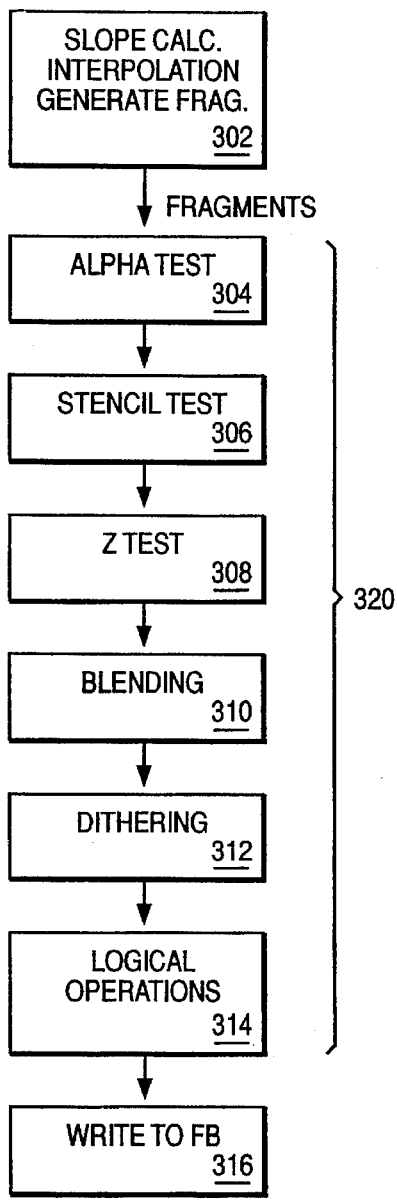
FIG. 3 is a function chart illustrating the functions performed by a graphics system implemented according to the present invention.

The rasterizer 206 performs considerable processing on each graphics command. The processing of rasterizer 206 is illustrated in FIG. 3. The rasterizer interprets each command (graphics primitive) and begins generating the pixels to draw the requested object. The rasterizer first calculates the slope 302, then performs pixel processing on the generated pixel including tests of the pixel and operations on the pixel 320. These tests and operations include an alpha test 304, a stencil test 306, a z buffer test 308, blending 310, dithering 312, and logical operations 314. Pixel processing involves processing and storage of some function of data currently in the frame buffer and the content of the generated pixel. After this processing the pixel data is written to the frame buffer 316.

The above function is a function of several variables that impose conditional computation leading to branch instructions. For example, a test from the group $<, >, =, \neq, \leq, \geq$ may be required. The present invention provides a solution that reduces the number of variables that impose conditional computation.

The present invention provides a combination of compact procedure code and data tables that provide the desired test result with a minimum of branch instructions.

The procedural code is based on a sign function, $\alpha$. The sign function is expressed as:

$$\sigma(x) = \begin{cases} 1 & \text{if } x > 0 \\ 0 & \text{if } x = 0 \\ -1 & \text{if } x < 0 \end{cases} \quad (1)$$

The sign function is used as a basis function to represent all other functions in the procedural transformation technique.

Procedural transformation according to the present invention requires determination of a single function that can return the proper result for several different tests by varying only the parameters used in the function. These parameters can be stored in memory. Selection of the parameters based on the test type requires no branching and a single function for several tests minimizes code.

As an example, assume it is desired to return a "1" whenever each of the following tests is true:

$$\begin{aligned} y &> z \\ y &< z \\ y &\geq z \\ y &\neq z \\ y &= z \end{aligned} \quad (2)$$

The following function can be derived based on parameters a,b,c,and d.

$$F(x,a,b,c,d)=((a\sigma(x)+b)(c\sigma(x)+d)>0) \quad (3)$$

where $\sigma$ is the sign function as defined above and a,b,c,d are coefficient selected based on the test desired. The coefficients are selected from the following table:

| | Table of Coefficients | | | |
|---|---|---|---|---|
| Function | a | b | c | d |
| > | 1 | 0 | 0 | 1 |
| < | −1 | 0 | 0 | 1 |
| ≥ | 1 | 1 | 0 | 1 |
| ≤ | −1 | 1 | 0 | 1 |
| ≠ | 1 | 0 | 1 | 0 |
| = | −1 | 1 | 1 | 1 |
| always | 0 | 1 | 0 | 1 |
| never | 0 | 0 | 0 | 0 |

The evaluation of the function F(x,a,b,c,d) could itself be replaced by a table lookup. This would be desirable if computation is more expensive than storage on the computation model on which the code is implemented. The evaluation can be avoided by maintaining a table indexed by $\sigma(x)$. Since $\sigma$ can take on the values of −1, 0, and 1, each derived function needs three entries in the table. Twenty four boolean entries would be required to implement the eight functions described above. This basis table can be implemented in either hardware or software because it is relatively small.

| | Basis Table | | |
|---|---|---|---|
| Function | $\sigma(x) = -1$ | $\sigma(x) = 0$ | $\sigma(x) = 1$ |
| > | 0 | 0 | 1 |
| < | 1 | 0 | 0 |
| ≥ | 0 | 1 | 1 |
| ≤ | 1 | 1 | 0 |
| ≠ | 1 | 0 | 1 |
| = | 0 | 1 | 0 |
| always | 1 | 1 | 1 |
| never | 0 | 0 | 0 |

Operation

Figure 5:
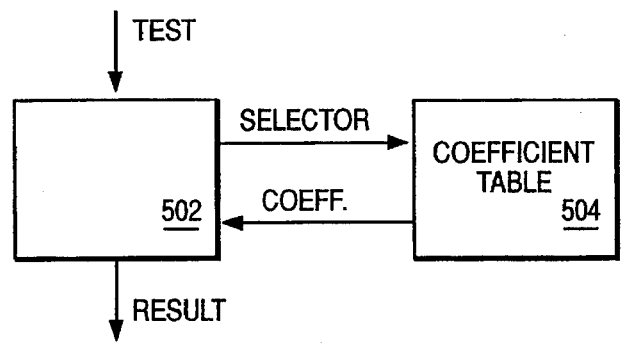
FIG. 5 is a block diagram of the system according to the present invention.

The present invention uses a lookup table containing coefficients selected by a selector value to implement the pixel processing functions of a high function graphics system. The system is generally structured as shown in FIG. 5. The pixel processing described above and comprising elements 320 of FIG. 3, is implemented in pixel processing element 502. The pixel processing element receives a test request, generates the necessary selector based on the test request, and uses the selector to access lookup table 504. The coefficients for the function are provided by the lookup table 504 to pixel processor 502.

Figure 4:
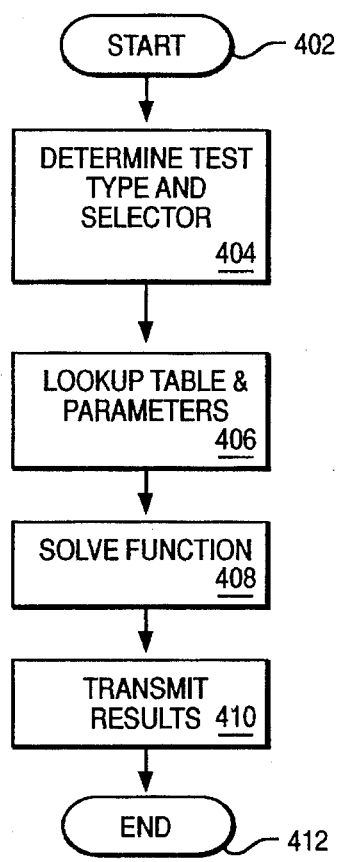
FIG. 4 is a flowchart illustrating the method steps of the present invention.

The process of the present invention is shown in FIG. 4. The pixel processing starts at 402 and immediately proceeds to step 404 Determine Test Type and Selector. The selector is used to access the lookup table, step 406. The pixel processing function is solved 408 and the transformed pixel data transmitted to the frame buffer 412. The process ends as step 412.

This general system and process is used for each of the separate pixel processing tests 304–314 shown in FIG. 3. The system can also be extended to other functions by the addition of the function description and lookup table entries. The pixel functions shown in FIG. 3 will be described in greater detail below.

Virtual Scan line buffers

The present invention allows graphics processing on many kinds of hardware configurations. Some hardware may not implement certain features such as Z buffer testing or alpha buffer testing. Prior art systems require a test to determine whether a particular feature is implemented. This test generates a branch instruction that generally decreases performance of a graphics system.

The present invention establishes a virtual scan line buffer that allows pixel processing to continue without testing for existence of a particular buffer. The virtual scan line buffer allows the pixel processor to store into the buffer without error and to read from the buffer without error. Reading from a virtual scan line buffer returns a value representable in the range of the buffer had the buffer actually existed. The virtual buffers are implemented using the scan line buffer. Linear addresses into the buffer are computed from the x and y addresses and the width of the buffer, i.e. address=y*width+x. The width of virtual buffer is treated as zero resulting in an addressable range of $[0–X_{max}]$.

The virtual buffer is created by allocating a scratch scan line buffer that can be shared across multiple contexts and windows. Alternatively, a scratch address space could be defined for use as a virtual scan line buffer.

The following tests can be implemented using this approach.

Scissor Test

The scissor test trims the pixels to a rectangular area specified by the coordinates of the bottom left and top right corner vertices, i.e. $(X_{b1},Y_{b1})$ and $(X_{tr},Y_{tr})$. This test will use the above basic table to implement the following equation:

$$S_{flag}(x,y)=(x \geq x_{b1}) \text{ AND } (x<x_{tr}) \text{ AND } (y \geq y_{b1}) \text{ AND } (y<y_{tr}) \quad (4)$$

Alpha Test

The alpha test will be implemented with the following equations and tables:

$$\Delta = \alpha - \alpha_b \quad (5)$$
$$G(\Delta,a,b,c,d) = (a\sigma(\Delta)+b)(c\sigma(\Delta)+d)$$
$$\alpha_{flag}(\Delta,a,b,c,d) = (G(\Delta,a,b,c,d)>0)$$

| Test | Alpha Test ($\alpha_{flag}$) | | | |
|---|---|---|---|---|
| | a | b | c | d |
| $\alpha > \alpha_b$ | 1 | 0 | 0 | 1 |
| $\alpha < \alpha_b$ | -1 | 0 | 0 | 1 |
| $\alpha \geq \alpha_b$ | 1 | 1 | 0 | 1 |
| $\alpha \leq \alpha_b$ | -1 | 1 | 0 | 1 |
| $\alpha \neq \alpha_b$ | 1 | 0 | 1 | 0 |
| $\alpha = \alpha_b$ | -1 | 1 | 1 | 1 |
| $\alpha$ always | 0 | 1 | 0 | 1 |
| $\alpha$ never | 0 | 0 | 0 | 0 |
| $\alpha$ disabled | 0 | 1 | 0 | 1 |

The virtual scan line buffer is used when an actual alpha buffer is not present. The virtual buffer ensures that no error condition is generated by always causing the alpha test to pass.

Stencil Test

The resolution of the stencil buffer is set to be n bits per pixel. The boolean result for the stencil test, $St_{flag}$, will similar to the alpha flag above. The stencil result is determined from the following equation.

$$s_b=(1-St_{flag})s_b+St_{flag}(k*s_b+b*s_{ref}+c)=s_b+St_{flag}(a*s_b+b*s_{ref}+c) \quad (6)$$

The value of $St_{flag}$ is determined from the following table:

| | Stencil Buffer Update ($St_{flag}$) | | |
|---|---|---|---|
| Operation | a | b | c |
| Keep | 0 | 0 | 0 |
| Replace | -1 | 1 | 0 |
| Zero | -1 | 0 | 0 |
| Incr. | 0 | 0 | 1 |
| Decr. | 0 | 0 | -1 |
| Invert | -2 | 0 | $2^n - 1$ |

The use of a virtual buffer will cause the test to always pass when the stencil buffer is absent.

Z tests, Z Buffer Update and Stencil Buffer Update The following equations will be used for the depth test and the depth buffer update.

$$\Delta = Z - Z_b \quad (7)$$
$$G(\Delta,a,b,c,d) = (a\sigma(\Delta)+b)(c\sigma(\Delta)+d)$$
$$Z_{flag}(\Delta,a,b,c,d) = (G(\Delta,a,b,c,d)>0)$$
$$z_b = z_b + Z_{flag}\Delta$$

The parameters are determined according to the following table.

| Test | Depth Test and Depth Buffer Update ($Z_{flag}$) | | | |
|---|---|---|---|---|
| | a | b | c | d |
| $z > z_b$ | 1 | 0 | 0 | 1 |
| $z < z_b$ | -1 | 0 | 0 | 1 |
| $z \geq z_b$ | 1 | 1 | 0 | 1 |
| $z \leq z_b$ | -1 | 1 | 0 | 1 |
| $z \neq z_b$ | 1 | 0 | 1 | 0 |
| $z = z_b$ | -1 | 1 | 1 | 1 |

-continued

Depth Test and Depth Buffer Update ($Z_{flag}$)

| Test | a | b | c | d |
|---|---|---|---|---|
| z always | 0 | 1 | 0 | 1 |
| z never | 0 | 0 | 0 | 0 |
| z disabled | 0 | 1 | 0 | 1 |

The virtual buffer is used whenever a z buffer is absent to ensure that the test always passes.

Blending

Blending is accomplished by the following tables and equations where n is the number of bits in the alpha component.

$$F = C_s S + C_d D \quad (8)$$

The source blending factor is determined from equation (9) below.

$$K = bA_s + cA_d + d \quad (9)$$
$$S_r = aC_d^r + K$$
$$S_g = aC_d^g + K$$
$$S_b = aC_d^b + K$$
$$S_a = aC_d^a + K$$

In the preferred embodiment the quantities are normalized by shifting by n bits.

The source blending function is determined from the following table.

Source Blending Function

| Operation | a | b | c | d |
|---|---|---|---|---|
| Zero | 0 | 0 | 0 | 0 |
| One | 0 | 0 | 0 | $2^n - 1$ |
| DST_COLOR | 1 | 0 | 0 | 0 |
| One_Minus_DST_COLOR | −1 | 0 | 1 | $2^n$ |
| SRC_ALPHA | 0 | 1 | 0 | 0 |
| One_Minus_SRC_ALPHA | 0 | −1 | 0 | $2^n - 1$ |
| DST_ALPHA | −1 | 0 | 0 | $2^n - 1$ |
| One_Minute_DST_ALPHA | 0 | 0 | −1 | $2^n - 1$ |
| SRC_ALPHA_Saturate | * | * | * | * |

The SRC_ALPHA_Saturate condition, indicated by * in the table, is handled by a separate equivalence class.

The Destination Blending Factor is determined as follows:

$$K = bA_s + cA_d + d \quad (10)$$
$$D_r = aC_s^r + K$$
$$D_g = aC_s^g + K$$
$$D_b = aC_s^b + K$$
$$D_a = aC_s^a + K$$

Dithering

The basic dithering equation according to the present invention is:

$$\Delta = G(C_e, C_{mask}) - \text{dith\_matrix}[x][y] \quad C_{out} = G(C_e, C_{mask}) + (\Delta > 0) \quad (11)$$

Logical Operations

Logical operations cannot be represented as compactly as a linear combination of simple functions. Equivalence classes can be created, however, to represent the functions. The preferred embodiment of the invention supports sixteen logical operations that can be grouped as follows:

1. $0, 1, s, \bar{s}, d, \bar{d}, s \vee d, s \vee \bar{d}, \bar{s} \vee d, \bar{s} \vee \bar{d}$ (12)
2. $\bar{s} \wedge \bar{d}, \bar{s} \wedge d, s \wedge \bar{d}, s \wedge d$
3. $s \text{ XOR } d, \overline{s \text{ XOR } d}$ For class 1 above, the function equation is:

$$F = (as \vee bd) \vee (c\bar{s} \vee e\bar{d}) \quad (13)$$

In alternate embodiments the above equation can be replaced by a masking operation since all of the coefficients are either 0 or 1. The coefficient table is:

First Table of Logical Operations

| Function | a | b | c | e |
|---|---|---|---|---|
| 0 | 0 | 0 | 0 | 0 |
| 1 | 1 | 0 | 1 | 0 |
| s | 1 | 0 | 0 | 0 |
| $\bar{s}$ | 0 | 0 | 1 | 0 |
| d | 0 | 1 | 0 | 0 |
| $\bar{d}$ | 0 | 0 | 0 | 1 |
| $s \vee d$ | 1 | 1 | 0 | 0 |
| $\bar{s} \vee d$ | 0 | 1 | 1 | 0 |
| $s \vee \bar{d}$ | 1 | 0 | 0 | 1 |
| $\bar{s} \vee \bar{d}$ | 0 | 0 | 1 | 1 |

The second class compact function is:

$$F = (fs \vee g\bar{s}) \wedge (hd \vee i\bar{d}) \quad (14)$$

The associated coefficient table is:

Second Table of Logical Operations

| Function | f | g | h | i |
|---|---|---|---|---|
| $\bar{s} \wedge \bar{d}$ | 0 | 1 | 0 | 1 |
| $\bar{s} \wedge d$ | 0 | 1 | 1 | 0 |
| $s \wedge \bar{d}$ | 1 | 0 | 0 | 1 |
| $s \wedge d$ | 1 | 0 | 1 | 0 |

The compact function for the third class is:

$$F = a(s \text{ XOR } d) + (1-a)(\overline{s \text{ XOR } d}) \quad (15)$$

The coefficient table for the third class is:

Third Table of Logical Operations

| Function | a |
|---|---|
| s XOR d | 1 |
| $\overline{s \text{ XOR } d}$ | 0 |

The preferred embodiment implements pixel processing using a selected few CPU instructions. These instructions include:

sign function ($\sigma$) to determine the sign of a variable;

multiply function for integer multiplication; and greater-than-zero-check function returning 1 if a variable is greater than zero, and 0 otherwise. If this instruction is not present, it can be derived from the sign function as:

$$\frac{(1 + \sigma(x))}{2} = \begin{cases} 1 & \text{if } x > 0 \\ 0 & \text{if } x \leq 0 \end{cases} \quad (16)$$

The present invention implements pixel processing using a limited number of linear functions modified by coefficients determined from a coefficient table. This results in small code that implements the needed range of functions with a minimum number of branch instructions. The instructions used by the functions include sign, integer multiply, and greater-than-zero-check and exclude instructions that would cause a branch in the instruction pipeline.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A system for transforming graphics pixel data in a graphics processing system having a processor and storage means, the system comprising:

means for receiving a pixel processing test request;

selector means for determining a test function as one of a plurality of test functions and a test selector for said pixel processing request to be performed on said pixel data;

table lookup means for transmitting to said processor coefficient data for a selected one of said plurality of tests, said coefficient data selected in response to said test selector;

pixel transformation means for transforming said pixel data based upon said coefficient data and said test function.

2. A method for transforming pixel data according to a pixel transformation function, said method being performed in a graphics processing system having a processor and storage, said method comprising the steps of:

receiving pixel data and a pixel processing request;

determining a test function and a test selector from said pixel processing request;

selecting a plurality of coefficients for said test function from a table based upon said test selector; and transforming said pixel data in accordance with said test function and said plurality of coefficients.

3. A computer program product having a computer readable medium having computer program logic recorded thereon for transforming pixel data, said computer program product comprising:

computer program product means for causing a computer system to receive a pixel processing request;

computer program product means for causing a computer system to determine a test function and a test selector for said pixel processing request to be performed on said pixel data;

computer program product means for causing a computer system to transmit coefficient data for one of a plurality of tests, said coefficient data selected in response to said test selector;

computer program product means for causing a computer system to transform said pixel data based upon said coefficient data and said test function.

* * * * *